(12) United States Patent
Au et al.

(10) Patent No.: US 6,970,392 B1
(45) Date of Patent: Nov. 29, 2005

(54) HIGH SPEED ASYNCHRONOUS AND PROGRAMMABLE STATE MACHINE FOR GENERATING ALMOST FULL SYNCHRONOUS FLAGS IN A SYNCHRONOUS FIFO

(75) Inventors: Johnie Au, Cupertino, CA (US); Chia Jen Chang, San Jose, CA (US); Parinda Mekara, Sunnyvale, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 719 days.

(21) Appl. No.: 09/895,306

(22) Filed: Jun. 29, 2001

(51) Int. Cl.[7] .................................. G11C 7/00
(52) U.S. Cl. ....................................... 365/221
(58) Field of Search ........................... 713/1; 365/221

(56) References Cited

U.S. PATENT DOCUMENTS

| | | | |
|---|---|---|---|
| 5,491,659 A * | 2/1996 | Howarter et al. | 365/219 |
| 5,506,809 A * | 4/1996 | Csoppenszky et al. | 365/221 |
| 5,955,897 A * | 9/1999 | Narayana et al. | 326/105 |
| 5,994,920 A * | 11/1999 | Narayana et al. | 326/46 |
| 6,016,403 A * | 1/2000 | Hawkins et al. | 710/57 |
| 6,757,763 B1 * | 6/2004 | Preiss et al. | 710/105 |

OTHER PUBLICATIONS

Johnie Au et al., "High Speed FIFO Synchronous Programmable Full and Empty Flag Generation", U.S. Appl. No. 09/957,587, filed Sep. 20, 2001.
Johnie Au et al., "High Speed Asynchronous and Programmable State Machine for Generating Almost Empty Synchronous Flags in a FIFO", U.S. Appl. No. 09/895,305, filed Jun. 30, 2001.
Johnie Au et al., "High Speed FIFO Synchronous Programmable Full and Empty Generation", U.S Appl. No. 09/957,015, filed Sep. 20, 2001.

* cited by examiner

*Primary Examiner*—Lynne H. Browne
*Assistant Examiner*—Eric Chang (57) ABSTRACT

A state machine comprising a first input receiving a first read clock, a second input receiving a first write clock, a third input receiving a first programmable Almost Full look-ahead signal, a fourth input receiving a second read clock, a fifth input receiving a second write clock, and a sixth input receiving a second programmable Almost Full look-ahead signal is disclosed. The state machine manipulates the inputs to produce an output signal representing an Almost Full output flag that is at a first logic state when a FIFO is Almost Full and is at a second logic state when the FIFO is Not Almost Full.

23 Claims, 5 Drawing Sheets

HIGH SPEED ASYNCHRONOUS AND PROGRAMMABLE STATE MACHINE FOR GENERATING ALMOST FULL SYNCHRONOUS FLAGS IN A SYNCHRONOUS FIFO

BACKGROUND OF THE INVENTION

1. Field of the Invention

The present invention relates to FIFO buffers generally, and more specifically, to a high speed asynchronous and programmable state machine configured to generate Almost Full synchronous flags in a synchronous FIFO buffer.

2. Discussion of the Prior Art

A FIFO is a two-port memory based on dual-ported RAM cells. One port is used for writing data into the memory, while the other port is used for reading data out. A memory location in a FIFO is written to and is read from simultaneously, and a FIFO's first-in/first-out architecture or device, defines the method for storing and retrieving data from memory: data is written into a FIFO at one value at a time, and is read from the device in the same order as it was written in.

A FIFO doesn't require an address to access data, unlike RAM, or read-only memories (ROM). Another difference between a FIFO and a RAM, or ROM, is the data retention: in a RAM or ROM, data at a particular address remains unchanged until another value is written into the memory, and reading a data value out does not change the data value stored at a particular address. In a FIFO, data written into the memory is retained until it is read out. However, once the data word is read out, it no longer exists in the memory and cannot be accessed again. The exception is a FIFO that has a retransmit feature. The retransmission feature allows for a segment of a FIFO's memory to be read many times, although the data is written into the FIFO only once.

Due to the nature of their data retention, a FIFO (without a retransmission feature) has a state of "Data Fullness" associated with it. More specifically, a FIFO can be Empty, Almost Empty, partially Empty, partially Full, Almost Full, and Full. Thus, a FIFO requires additional signal lines, or flags, to indicate the state of its memory content. The number of data words a FIFO can store before it is Full depends on its size.

Because of a FIFO's unique features, like the lack of addressing requirements, FIFOs are useful in a class of applications with a serial streams of data. A FIFO provides data at the read port in the same order the data was presented at the write port, so that no additional circuitry is needed to implement a store-and-forward buffer. In the store-and-forward buffer, the data is written into the FIFO by a high-speed data source and is read out onto a lower-speed data bus. Thus, the FIFO converts the data rate from a high speed to a lower speed without any specific relationship between its input and output data rates. This means that a FIFO can serve as a link between two asynchronous interfaces.

While a random-access memories (RAM) can perform write and read operations only sequentially, a FIFO can do these operations simultaneously. Thus, a FIFO has twice the throughput of a conventional RAM. When its shift-in and shift-out signals are derived from independent frequency sources, FIFO is operating asynchronously. If this is the case, the relationship between the output system clock and an output-ready signal is not known, either with respect to frequency, or with respect to phase.

However, when its shift-in and shift-out signals are derived from a common frequency source or clock, so that there is a precise, known relationship between them—the FIFO is by definition in the synchronous mode. The key advantages of the synchronous FIFO over the asynchronous FIFO, are as follows:

(A) Registered interfaces at the input and output provide the simplest and fastest FIFO interfacing because all signals are synchronized to the rising edges of the read or write system clocks, which run continuously and are applied directly to the FIFO;

(B) Read and write operations are easily manipulated by external, synchronous read and write state machines, which in turn are controlled by the read and write system clocks; the flags are internally synchronized to their respective clocks, and external synchronizers are no longer needed;

(C) Read and write operations are controlled by enables, thereby eliminating any need for externally-generated read and write strobes; noise immunity is improved because the enable signals are sampled during the rising edge of the clock rather than in response to a level, thus increasing the reliability.

Accordingly, the following discussion is focused on synchronous FIFOs. Typical FIFO includes a 64 Kbit depth and 80 bits width, whereas the word is typically 80 bits long. One pointer, read or write, points to only one word. However, the "read out" or "write in" operations can be implemented in 4 modes: (a) read out 80-mode, (b) write in 80-mode (at each clock the whole word is read out or written in), (c) read out 40-mode, and (d) write in 40-mode (at each of two clocks the whole word is read out or written in).

The number of words N retained in the FIFO memory is as follows:

$$N = W - R; \tag{1}$$

wherein W is the number of words written into the memory; and R is the number of words that are read out from the memory.

To prevent a "too fast" read out, a read enable clock is activated only after a first word is written into the FIFO memory buffer. Thus, the read out operation has to wait depending on the particular FIFO device between (2–4) clocks before the first word is read out. For the second word there is no such limitation. Each time when a FIFO is completely read out, an Empty flag is generated by a state machine. An enabling signal delays the generation of an Empty flag, that is the change of the Empty flag state from "zero" to "one is delayed, by a waiting period between (2–4) clocks needed for the first word to be read out. This prevents reading out the word that has not been written in yet. Reading out the word that has not been written in yet is called underflow. The time needed for the first word to come out from the FIFO buffer is called the fall through time.

For the complementary situation, when the writing in is done very fast, and the read out is very slow, a FIFO can be filled over capacity. This situation is called overflow. To prevent the overflow from happening, the Full flag is generated by the enabling Full signal to indicate that the writing into the FIFO should stop before the first word is read out.

The prior art Almost Empty flags were used to indicate that only few words X could be written into the FIFO buffer. Thus, an offset X defining the word "Almost", is also an "Almost Empty" threshold. The Almost Empty offset, or threshold, X is a user programmable offset. The user can set an offset value X anywhere between Full and Empty so that if the number of words N left in a FIFO is less than the threshold X, the read out is impossible, and an Almost Empty Flag is generated:

$$\text{If } ((N=W-R) \leq X) \text{ then Almost\_Empty\_}N=0; \quad (2)$$

wherein W is the number of words that are written in, R is the number of words that are read out, and Almost_Empty_N is a read pointer.

Complementary, if the programable threshold for the number of memory space (measured in words) left is Y, and if the actual memory space left in a FIFO is less than the threshold Y, the write in is impossible, and an Almost Full flag is generated:

$$\text{If } (((\text{Depth}-(W-R)) \leq Y) \text{ then Almost\_Full\_}N=0; \quad (3)$$

wherein Depth is the depth of the FIFO, W is the number of words that are written in, R is the number of words that are read out, and Almost_Full_N is a write pointer.

The prior art implementation of the Almost Empty and Almost Full flag generators was done by using a traditional "adder approach". In this traditional "adder approach", the relationship (2) and/or (3) are implemented by using a write counter, a read counter, a program value offset register, a triple input carry look ahead adder/comparator (including a prediction algorithm to predict the next value), and an adder glitch filter (to minimize noise).

The problem with this prior art "adder approach" is that the triple input carry look ahead adder/comparator is too slow because to do additions and comparisons the prior art adder circuitry requires 6 nsec.

What is needed is to implement the relationship (2) and (3) without an adder in order to significantly reduce the time required for this operation.

SUMMARY OF THE INVENTION

The present invention provides a high speed asynchronous and programmable state machine utilized for generating Almost Full synchronous flags in a synchronous FIFO. The present invention uses a "state machine approach" and eliminates an adder altogether. In the present "state machine approach" a look ahead signal is generated when the following logical statements reach the true value:

$$\text{If } (W == (R+X)), \text{ then look ahead\_signal} = 1; \text{ and/or} \quad (4)$$

$$\text{If } (W == R + \text{Depth} - (Y+1)), \text{ then lookahead\_signal} = 1. \quad (5)$$

X (and/or (Y+1)) offset are pre-loaded into the write pointer, the pointer is reset to "0", and only a comparator is required to check the 'true' or 'false' value of the logical statement (4) (and/or (5)) thus significantly reducing the time required for this operation as compared with the prior art "adder" approach for generating Almost Full flags.

More specifically, one aspect of the present invention is directed to a state machine. In one embodiment, the state machine comprises: (1) a first input receiving a first read clock, (2) a second input receiving a first write clock, (3) a third input receiving a first programmable Almost Full look-ahead signal, (4) a fourth input receiving a second read clock, (5) a fifth input receiving a second write clock, and (6) a sixth input receiving a second programmable Almost Full look-ahead signal. The state machine manipulates the inputs to produce an output signal representing an Almost Full output flag that is at a first logic state when a FIFO is Almost Full and is at a second logic state when the FIFO is Not Almost Full.

Another aspect of the present invention is directed to an apparatus comprising: (1) a first set state machine having a first input receiving a first read clock, a second input receiving a first write clock, a third input receiving a first programmable Almost Full look-ahead signal, and a fourth input to receive a first control signal; (2) a second set state machine having a first input receiving a second read clock, a second input receiving a second write clock, a third input receiving a second programmable Almost Full look-ahead signal, and a fourth input to receive a second control signal; and (3) a synchronizer coupled to the second set state machine. The first set state machine manipulates its inputs to produce a first set_output signal that is either at a first logic state or at a second logic state, whereas the second set state machine manipulates its inputs to produce a second set_output signal that is either at the first logic state or at the second logic state. The synchronizer receives the second set_output signal and receiving a reset signal. The synchronizer is configured to generate a synchronized output signal.

The apparatus of the present invention further comprises: (4) a latch having a first input receiving the first set_output signal, and a second input receiving the synchronized output signal. A first latch_output presents the first set_output signal as a first latch_output signal, whereas a second_latch output presents the synchronized output signal as a second latch_output signal. The latch is configured to hold the first latch_output signal and the second latch_output signal until the first set_output signal and second set_output signal change logic states. The first latch_output signal represents an Almost Full output flag that is at a first logic state when a FIFO memory block is Almost Full, and is at a second logic state when the FIFO is Not Almost Full. The second latch output signal represents a Not Almost Full output flag that is at the first logic state when the FIFO is Not Almost Full and is at the second logic state when the FIFO is Almost Full.

The apparatus of the present invention further comprises: (5) a first logic block having a logic input receiving the second latch_output signal, and (6) a second logic block having a logic input receiving the first latch_output signal. The first logic block includes a logic output presenting the second latch_output signal as the first control signal to the first set state machine; wherein the second logic block has a first logic output presenting the first latch output signal as the second control signal to the second set state machine; and a second logic output presenting the first latch_output signal as the reset signal to the synchronizer.

In one embodiment of the present invention, the synchronizer further includes an SR latch coupled to the second set state machine. The SR latch is configured to receive the second set_output signal from the second set state machine, and the reset signal from the second logic block, and is configured to time an output of the second set_output signal depending on the reset signal. A Flip-Flop (FF) block coupled to the SR latch is configured to receive the second set_output signal, and configured to time the presentation of the second set_output signal as the synchronized signal depending on an external timing signal.

In the preferred embodiment, the FIFO comprises a synchronous FIFO; the external timing signal comprises a free running write clock signal; the first read clock comprises a first enabled read clock; the first write clock comprises a first enabled write clock; the second read clock comprises a second enabled read clock; and the second write clock includes a second enabled write clock.

In one embodiment, the apparatus of the present invention further comprises a first delay block configured to provide a first predetermined delay to the first set_output signal in order to increase a pulse width of the first set_output signal. In one embodiment, the apparatus of the present invention further comprises a second delay block configured to provide a second predetermined delay to the second set_output signal in order to increase a pulse width of the second set_output signal. In one embodiment, the first delay block further includes a first programmable delay block configured to change a pulse width of the first set_output signal. In one embodiment, the second delay block further includes a second programmable delay block configured to change a pulse width of the second set_output signal.

One more aspect of the present invention is directed to a method for determining the Almost Fullness state of at least one memory buffer. In one embodiment, the method of the present invention further comprises the following steps: (1) generating at least one Almost Full output flag in response to a plurality of signals comprising: a first read clock, a first write clock, a first programmable Almost Full look-ahead signal, a second read clock, a second write clock, and a second programmable Almost Full look-ahead signal; (2) generating at least one Not Almost Full output flag in response to a plurality of signals comprising: a first read clock, a first write clock, a first programmable Almost Full look-ahead signal, a second read clock, a second write clock, and a second programmable Almost Full look-ahead signal; and (3) presenting the first read clock, the first write clock, the first programmable Almost Full look-ahead signal, the second read clock, the second write clock, and the second programmable Almost Full look-ahead signal to a state machine.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The main idea of the present invention is to use a FIFO memory buffer to provide a temporary memory buffer or storage between two communication systems. The traditional timing critical path of the adder is removed. The programmable Full flag of a FIFO is used as an interrupt to warn the system when the FIFO buffer becomes Almost Full which then blocks further write operations. By programming a user defined Programable Almost Full (PAF) offset, the system can monitor the PAF flag, and when the number of words in the FIFO increases above the threshold, the system will pause further write-ins to prevent overflow. This status flag is generated in real-time so as not to overflow the buffer.

Figure 1:
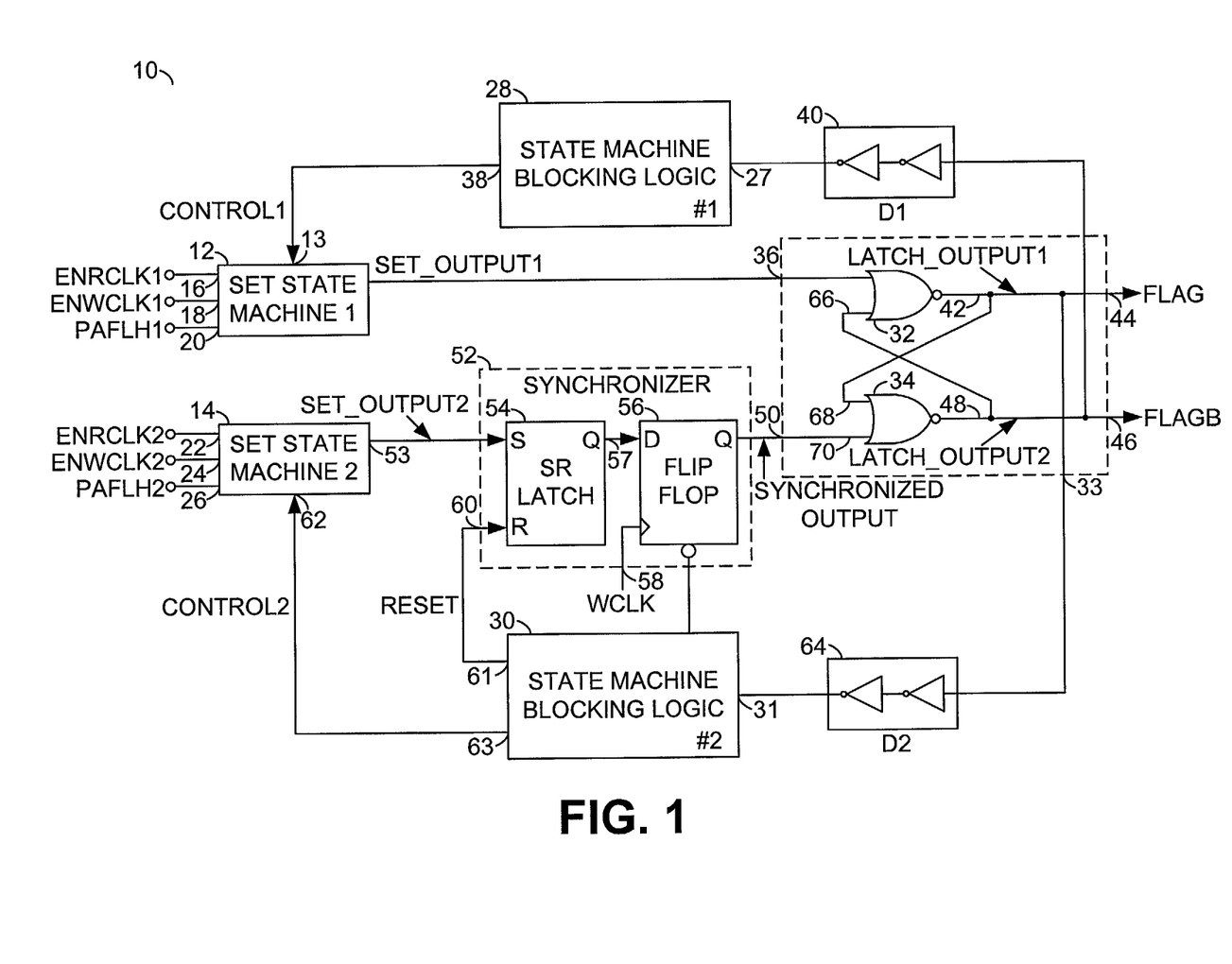
FIG. 1 depicts a block diagram of the Programmable Almost Full (PAF) flag generator of the present invention.

FIG. 1 depicts a block diagram 10 of the Programable Almost Full flag generator of the present invention. The block diagram 10 includes a new design methodology to generate high speed synchronous Almost Full flag status for a FIFO without using an adder. In the preferred embodiment, an asynchronous state machine approach is used. In one embodiment, the Almost Full flag generator 10 (of FIG. 1) can be used for high speed (266 MHz+, 3.76 ns- cycle) applications.

In one embodiment, the PAF flag generator 10 comprises a first set state machine block 12, a second set state machine 14, a latch 33, a synchronizer 52, a first state machine blocking logic block 28, and a second state machine blocking logic block 30.

The first set state machine 12 has a first input 16 that receives a signal $Enrclk_1$ which represents a first enabled read clock, a second input 18 that receives a signal $Enwclk_1$ representing a first enabled write clock and a third input 20 that receives a signal $Paflh_1$ which is a first programable Almost Full look-ahead signal. The first enabled read clock $Enrclk_1$ and the first enabled write clock $Enwclk_1$ each drive a counter. Each of these counters have two built-in sub-counters. A first sub-counter is an exact sub-counter and starts counting from zero after a reset signal. A second sub-counter is a plus one counter that starts counting from one after a reset. The first programable Almost Full look-ahead signal $Paflh_1$ is a signal that is generated externally from the set state machine 12, but internally to the FIFO (not shown) and is a result of a bitwise exclusive OR of the plus one write sub-counter and the exact read sub-counter. The first set state machine 12 manipulates the inputs 16, 18, 20 and 38 (see discussion below) to produce a first output signal 36 that is either at the first logic state or at the second logic state. The first set state machine output 36 changes its logical state only at rising edge of enabled first write clock signal Enwclk$_1$ 18.

Similarly, the second set state machine 14 has a first input 22 that receives a signal Enrclk$_2$ which represents a second enabled read clock, a second input 24 that receives a signal Enwclk$_2$ representing a second enabled write clock and a third input 26 that receives a signal Paflh$_2$ which is a second programable Almost Full look-ahead signal. The second enabled write clock Enwclk$_2$ (and the second enabled read clock Enrclk$_2$) drives a counter. Each of these counters have two built-in sub-counters. A first sub-counter is an exact sub-counter and starts counting from zero after a reset signal. A second sub-counter is a plus one counter that starts counting from one after a reset. The second programable Almost Full look-ahead signal Paflh$_2$ is a signal that is generated externally from the second set state machine 14, but internally to the FIFO (not shown) and is a result of a bitwise exclusive OR of the plus one write sub-counter and the exact read sub-counter. The second set state machine 14 manipulates the inputs 22, 24, 26 and 62 (see discussion below) to produce a second output signal 53 that is either at the first logic state or at the second logic state. The second set state machine output signal 53 changes its logical state only at a rising edge of the enabled second write clock signal Enwclk$_2$ 24.

Referring still to FIG. 1, the PAF flag generator 10 further includes a synchronizer 52 coupled to the second set state machine 14. The synchronizer 54 receives the second set state machine output signal 53, receives a reset signal 60, and generates a synchronized output signal 50.

Referring still to FIG. 1, the apparatus 10 further includes a latch 33 having a first input 64 receiving the output signal 36 from the first set state machine 12, and a second input 70 receiving the synchronized output signal 50 from the synchronizer 52. A first latch output 42 presents the first set machine output signal 36 as a first latch output signal 44, and a second latch output 48 presents the synchronized output signal 50 as a second latch output signal 46. The latch 33 is configured to hold the first latch output signal and the second latch output signal until the first set machine output signal 36 and second set output signal 53 change logic states. The first latch output signal 44 represents an Almost Full output flag that is at a first logic state when a FIFO block is Almost Full, and is at a second logic state when the FIFO is Not Almost Full. The second latch output signal 46 represents the Not Almost Full output flag that is at the first logic state when the FIFO is Not Almost Full and is at the second logic state when the FIFO is Almost Full.

Referring still to FIG. 1, the apparatus 10 further includes a first set state machine logic block 28 having a logic input 27 receiving the second latch output signal 46, and a logic output 38 presenting the second latch output signal 46 as the first control signal 13 to the first set state machine 12. The apparatus 10 also includes a second logic block 30 having a logic input 31 receiving the first latch output signal 44, a first logic output 61 presenting the first latch output signal 44 as the second control signal 62 to the second set state machine 14, and a second logic output 61 presenting the first latch output signal 44 as the reset signal 60 to the synchronizer 52.

Figure 2A:
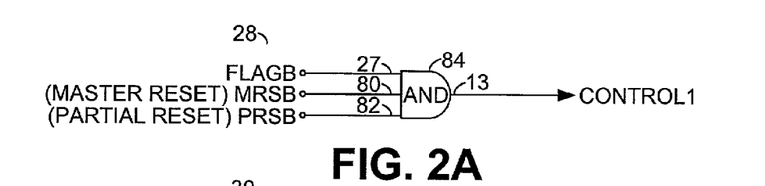
FIG. 2A illustrates the first set machine blocking logic block configured to generate a first control signal.
Figure 2B:
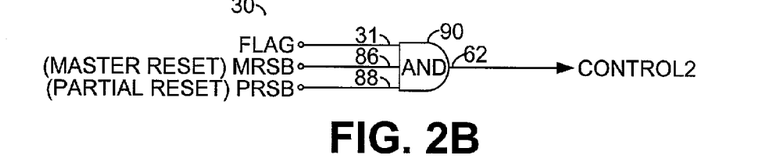
FIG. 2B shows the second set machine blocking logic block configured to generate a second control signal.

FIG. 2A depicts the first set machine blocking logic block 28 in more details. The AND gate 84 manipulates the input signal flagb (the reversed flag signal 44), the master reset signal mrsb 80, and the partial reset signal prsb 82 to generate the first control signal 13. Similarly, FIG. 2B illustrates the second set machine blocking logic block 30 having the AND gate 90. The AND gate 90 manipulates the input flag signal 44, the master reset signal mrsb 86, and the partial reset signal prsb 88 to generate the second control signal 62.

Referring still to FIG. 1, in the preferred embodiment, the synchronizer 52 further includes an SR latch 54 coupled to the second set state machine 14. The SR latch 54 is configured to receive the second set output signal 53 from the second set state machine 14, and is configured to receive the reset signal 60 from the second set state machine logic block 30. The SR latch 54 is configured to time its output 57 of the second set output signal 53 depending on the reset signal 61. Please see discussion below.

Referring still to FIG. 1, in the preferred embodiment, the synchronizer 52 further includes a Flip-Flop (FF) block 56 coupled to the SR latch 54. The FF 56 is configured to receive the second set machine output signal 57 presented by the from the SR latch, and is configured to time the presentation of the second set output signal 57 as the synchronized signal 50 depending on an external timing signal 58. In the preferred embodiment, the external timing signal further comprises a free running write clock signal wCLK 58. The signal wCLK is a free running externally generated clock. The actual writing is performed by additionally providing a synchronous write enable input signal to the FIFO. When the enable input is active in a clock cycle, internally to the FIFO, an enabled write clock is generated. This is represented by the Enwclk inputs 18 and 24 to the set state machines 12 and 14. Similarly, an enabled read clock is generated. This is represented by the Enrclk inputs 16 and 22 to the set state machines 12 and 14.

Figure 3:
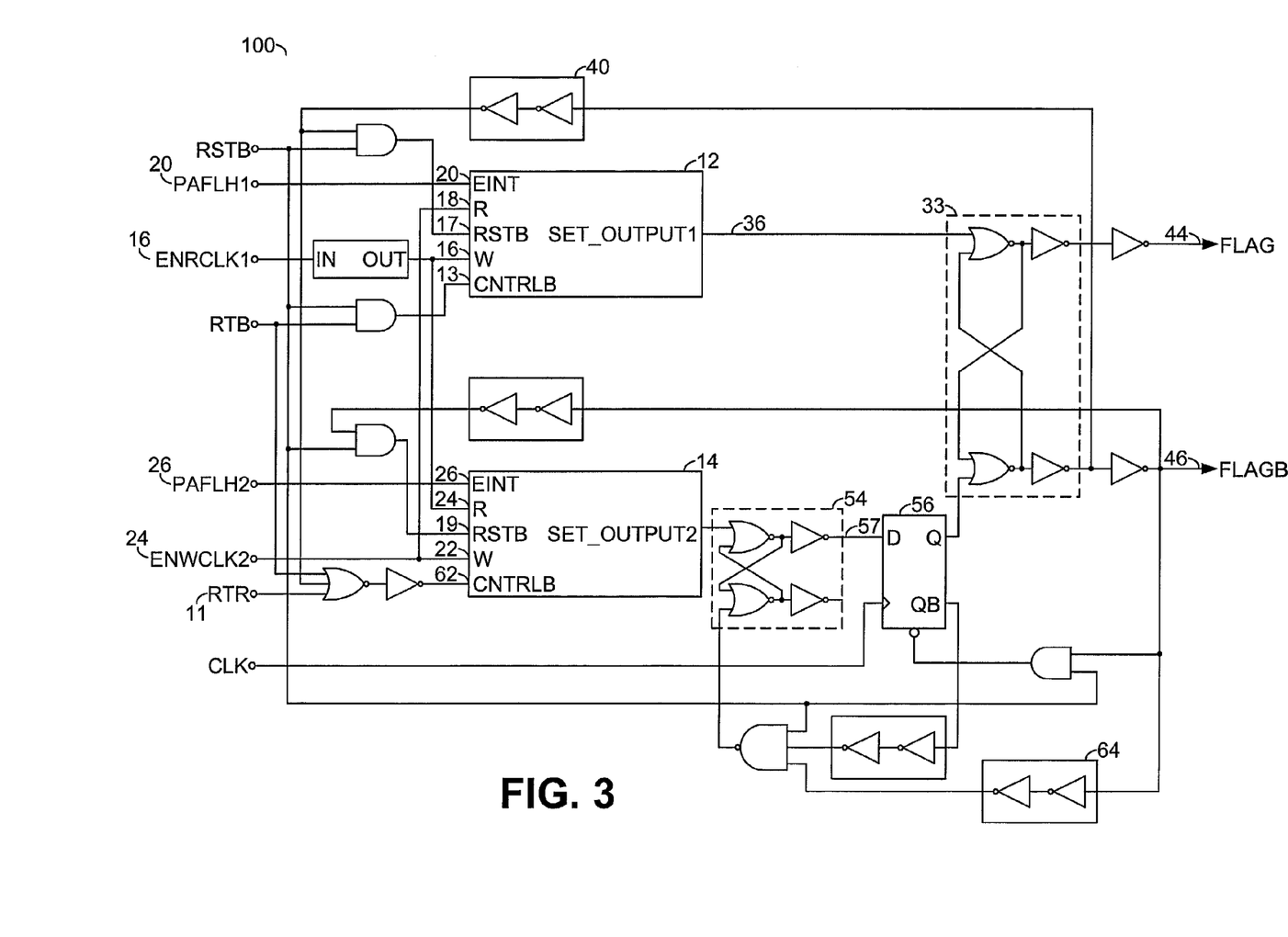
FIG. 3 depicts a more detailed block diagram of the Programable Almost Full (PAF) flag generator of FIG. 1.

Referring to FIG. 3, a more detailed block diagram of the Almost Full flag generator 10 is shown. The first set state machine 12 receives the first, second and third inputs 20, 18, and 16, as well as a fourth input 13 that represents the first control signal. The first set state machine 12 also has a fifth input 17 that receives the external master reset input rstb. Similarly, the second set state machine 14 receives the first, second and third inputs 26, 24, and 22, as well as a fourth input 62 that represents the second control signal. The second set state machine 14 also has a fifth input 19 that also receives the external master reset input rstb. The second set state machine also receives a sixth input 11 that represents an external retransmit recovery signal rtr. The external retransmit recovery signal rtr and the external master reset signal rstb are additional input signals (not shown in FIG. 1) that provide a means to reset the flag generator 10 from an external source.

It is believed that a detailed schematic of the set state machine 12 (or 14) is well known to a person skillful in the art and is not presented herein in all details. The logic of the set state machine 12 is illustrated by the following Table 1:

| Row# | 000 | 001 | 011 | 010 | 110 | 111 | 101 | 100 | Set |
|---|---|---|---|---|---|---|---|---|---|
| 0 | 0 | 1* | 2 | 3* | 4 | 5 | 6 | 7* | 1 |
| 1 | 0* | 1 | 2* | 3 | 4 | 5 | 6* | 7 | 1 |
| 2 | 0 | 1* | 2 | 3* | 4 | 5* | 6 | 7 | 1 |
| 3 | 0* | 1 | 2* | 3 | 4* | 5 | 6 | 7 | 1 |
| 4 | 0 | 1 | 2 | 3* | 4 | 13* | 14* | 7* | 1 |
| 5 | 0 | 1 | 2* | 3 | 4* | 5 | 6* | 7 | 1 |
| 6 | 0 | 1* | 2 | 3 | 4 | 5* | 6 | 7* | 1 |
| 7 | 0* | 1 | 2 | 3 | XX* | 5 | 14* | 7 | 1 |

-continued

| Row# | 000 | 001 | 011 | 010 | 110 | 111 | 101 | 100 | Set |
|------|-----|-----|-----|-----|-----|-----|-----|-----|-----|
| 8 | 0 | 9* | 10 | 3* | 4 | 13 | 14 | 7* | 0 |
| 9 | 0* | 9 | 10* | 3 | 4 | 13 | 14* | 7 | 0 |
| 10 | 0 | 9* | 10 | 3* | 4 | 13* | 14 | 7 | 0 |
| 11 | 0* | 9 | 10* | 3 | 4* | 13 | 14 | 7 | 0 |
| 12 | 0 | 9 | 10 | 3* | 4 | 13* | 14 | 7* | 0 |
| 13 | 0 | 9 | 10* | 3 | 4* | 13 | 14* | 7 | 0 |
| 14 | 0 | 9* | 10 | 3 | 4 | 13* | 14 | 7* | 0 |
| 15 | 0* | 9 | 10 | 3 | 4* | 13 | 14* | 7 | 0 |

The individual columns are labeled as a three bit binary value. The first bit, when the Almost Full flag generator 10 (of FIG. 1) is configured to generate an Almost Full flag, represents the programable Almost Full look ahead signal Paflh$_1$ 20 (of FIG. 1). The second bit represents the enabled read clock Enrclk$_1$ 16, whereas the third bit represents the enabled write clock Enwclk$_1$ 18. The column labeled Set represents the decoded output of the first set state machine 12.

A specified version of TABLE 1 where redundant states are eliminated is shown in the following TABLE 2:

| Row# | 000 | 001 | 011 | 010 | 110 | 111 | 101 | 100 | Set |
|------|-----|-----|-----|-----|-----|-----|-----|-----|-----|
| 0–3, 5, 6 (a) | A | A | A | A | b | A | A | c | 1 |
| 4 (b) | a | a | a | a | B | d | d | d (c) | 1 |
| 7 (c) | a | a | a | a | C | a | d | C | 1 |
| 8–15 (d) | b (a) | D | D | b (a) | b | D | D | c | 0 |

The logic of the second set state machine 14 is similar to the logic of the first set state machine and is not shown.

Thus, the present invention uses the first set state machine 12 and the second set state machine 14 that each handle two input clocks and a look-ahead signal. Each of the state machines 12 and 14 has four possible output states, as illustrated in TABLE 2. With design criteria requiring five input variables and eight output states, the implementation of two input set state machines 12 and 14 is far less complex than the implementation of a single state machine capable of handling all combinations. Furthermore, the simplicity of blocking logic blocks 28 and 30 allows one to maintain the simplicity of the set/set implementation of the present invention. While the use of smaller, more efficient set state machines 12 and 14 is superior to using a single more complex state machine, the present invention can be implemented using a single larger state machine without departing from the spirit of the present invention.

Figure 4A:
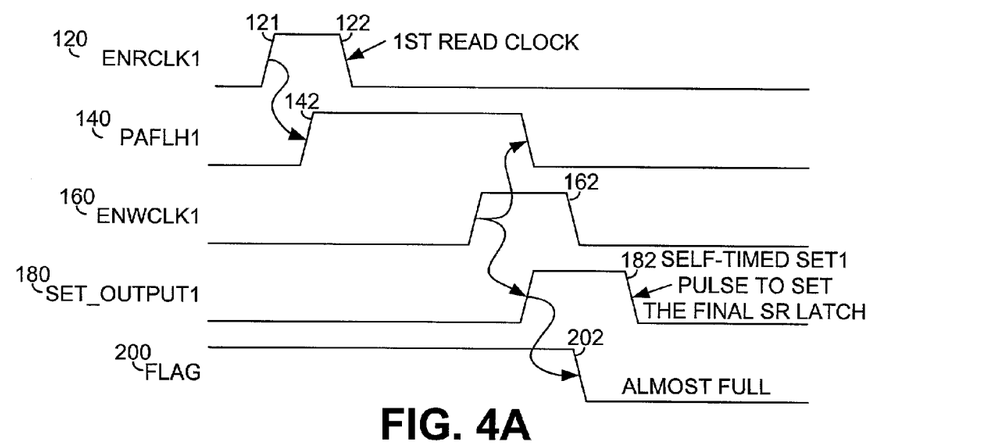
FIG. 4A illustrates a sequence of events for the first set state machine during the operation of the PAF flag generator of FIG. 1.
Figure 4B:
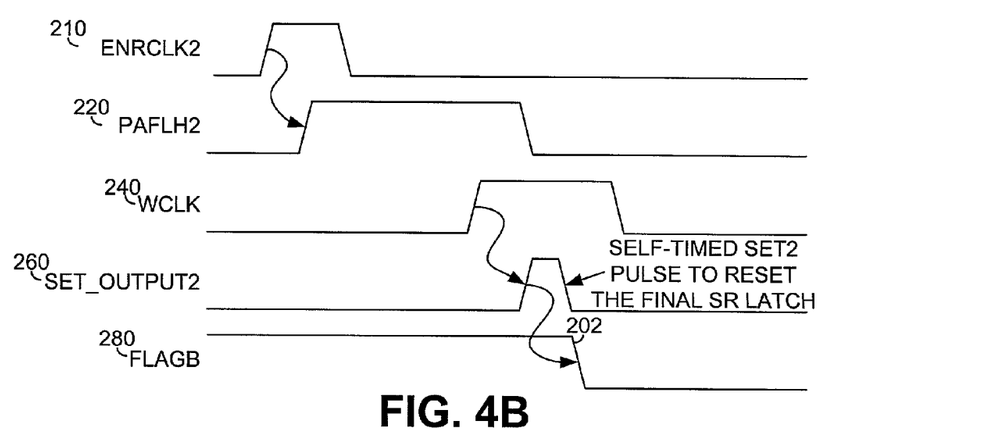
FIG. 4B depicts a sequence of events for the second set state machine during the operation of the PAF flag generator of FIG. 1.
Figure 5:
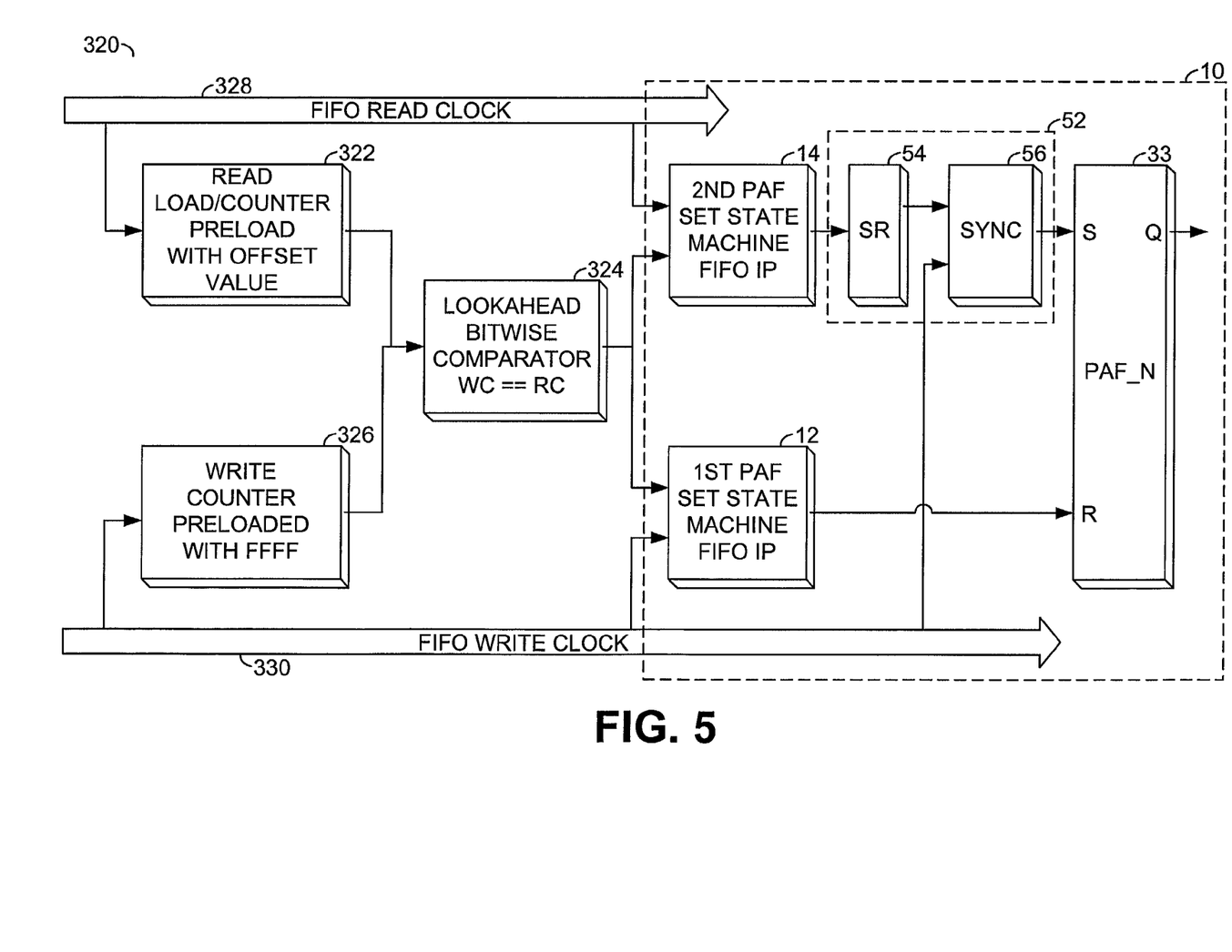
FIG. 5 shows the PAF flag generator at the architectural level of design.

FIG. 4A depicts a sequence of events for the first set state machine 12, whereas FIG. 4B depicts a sequence of events for the second set state machine 14 during the PAF flag generator 10 (of FIG. 1) operation. FIG. 5 depicts a block diagram 320 of the PAF flag generator at the architectural level of design.

At the architectural level, as shown in diagram 320 of FIG. 5, the PAF flag generator 10 (of FIG. 1) is synchronized by the read clock 328, shown as event diagram 210 of FIG. 4B. In the preferred embodiment of the present invention, the programable offset value is first preloaded into the read/load counter 322 of FIG. 5. The concept of preloading the user programable offset directly into the read counter upon programming allows one to eliminate the adder to adding up the read counter and the offset register. In one embodiment, the programable offset value is 17-bit "000 . . . 0". In another embodiment, the programable offset value is 17-bit "111 . . . 1".

In one embodiment, the programable offset value is equal to (R+(Depth−(Y+1))), as was stated above in Eq. (5). The read counter 322 of FIG. 5 increments R value from the offset value and up. As FIFO reaches the Almost Full status at the next read cycle, the second set state machine generates a "set_output $_2$" pulse at the next rising edge of the free running write clock wCLK (shown as the event diagram 240 of FIG. 4B). The pulse "set_output $_2$" actually resets the programmable Almost Full flag in S-R latch (54 of FIG. 1), and generates an active low signal state in the programmable Almost Full flag (event diagram 200 of FIG. 4A).

Similarly, when the FIFO becomes Not Almost Full, i.e., the FIFO has more than (offset+1) words, the first set state machine 12 (of FIG. 1) generates a "set output $_1$" pulse (depicted as event diagram 180 of FIG. 4A) at the next rising edge of the first read clock (shown as event diagram 120 of FIG. 4A). The "set_output $_1$" pulse within the first read clock pulse 120 is then synchronized by a wCLK 240 which then sets the programmable Almost Full flag in the SR latch and makes the programmable Almost Full go high (active low). The synchronizer block 52 consists of the SR-latch 54 followed by the flip-flop (FF) register 56 clocked by the wCLK clock 58. The SR-latch gets reset after the FF register 56 has been clocked high. The second set state machine is blocked/inhibited when the external flag is High, while the first set state machine is blocked/inhibited when the external flag is Low. This ensures that the final SR-latch (33 of FIG. 1) never receives simultaneous "set" and "reset" pulse which could lead into an illegal state for the SR-latch 33.

At the architectural level, as shown in diagram 320 of FIG. 5, the PAF flag generator utilizes the look ahead bitwise comparator 324 to generate both programable Almost Full look ahead signals Paflh$_1$ (shown as event diagram 140 of FIG. 4A), and Paflh$_2$ (shown as event diagram 220 of FIG. 4B).

In one embodiment of the present invention, the apparatus 10 of FIG. 1 for Almost Full flag generation further includes a first delay block D1 40 configured to provide a first predetermined delay to the first set output signal 36 by increasing the path length for the control signal 13 to reach the first set state machine 12. In one embodiment, the delay D1 is used to increase a pulse width of the first set output signal 36. In one embodiment, the first delay 40 block further includes a first predetermined delay block having a first predetermined delay configured during fabrication.

Figure 6:
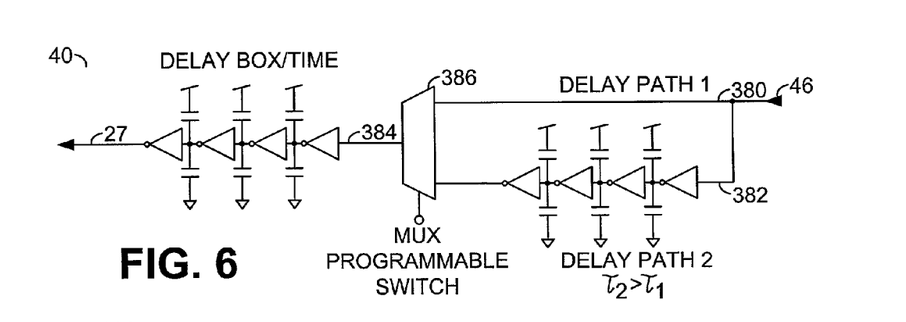
FIG. 6 illustrates the first delay block D1 configured to provide two paths with different paths lengths, or delays, to control signal for the first set state machine.

In an alternative embodiment, FIG. 6 illustrates the first delay block D1 40 configured to provide two paths 380 and 382 with different paths lengths, or delays, for control signal 13. In this embodiment, one of two paths 380 or 386 can be selected by using a programable multiplexer switch (MAX1) 386.

Figure 7A:
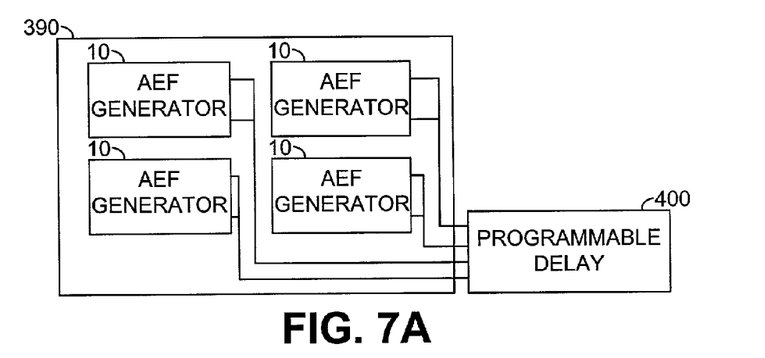
FIG. 7A shows how the joint test access group (JTAG) first programmable delay block is applied externally to the chip including the Almost Full flag Generator.
Figure 7B:
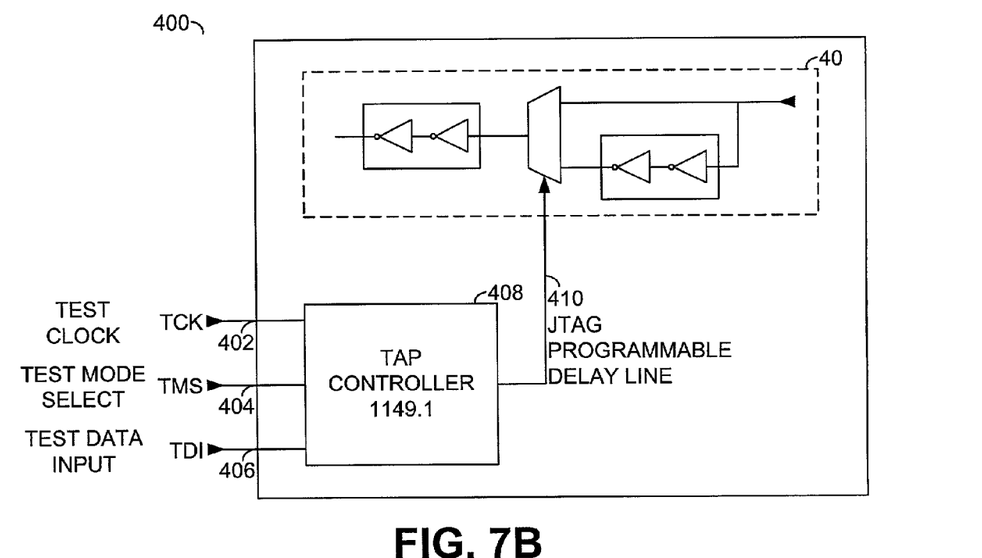
FIG. 7B depicts the first programmable delay block further comprising a joint test access group (JTAG) first programmable delay block, wherein the existing JTAG input ports are utilized by the TAP controller to program the JTAG delay line.

In one embodiment, the first delay block 40 further includes a first programmable delay block responsive to an externally generated signal. More specifically, in one embodiment, as depicted in FIG. 7B, the first programmable delay block 40 further comprises a joint test access group (JTAG) first programmable delay block, wherein the existing JTAG input ports 402 TCK (test clock port), 404 TMS (test mode selected), and 406 TDI (test data input) including a set of additional JTAG instructions are utilized by the TAP controller 408 to program the JTAG delay line 410. FIG. 7A shows how the joint test access group (JTAG) first programmable delay block 400 can be applied externally to the chip 390 including the Almost Full flag Generator.

Similarly, in one embodiment of the present invention, the apparatus 10 of FIG. 1 for Almost Full flag generation further includes a second delay block D2 64 configured to provide a second predetermined delay to the second set output signal 53 by increasing the path length for the control signal 62 to reach the second set state machine 14. In one embodiment, the delay D2 is used to increase a pulse width of the second set output signal 53. In one embodiment, the second delay 64 block further includes a second predetermined delay block having a first predetermined delay (not shown) configured during fabrication.

In another embodiment, the second delay block D2 64 (not shown) further includes a first programmable delay block. In this embodiment, one of two paths can be selected by using a programable multiplexer switch (MAX2) (not shown).

In one more embodiment, the second delay block D2 64 (not shown) further includes a first programmable delay block responsive to an externally generated signal. In one embodiment, the second programmable delay block D2 further comprises a joint test access group (JTAG) first programmable delay block, wherein the existing JTAG input ports TCK, TMS, TDI are utilized by the TAP controller to program the JTAG delay line.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus comprising:
   a first set state machine configured to generate a first set-output signal that is either at a first logic state or at a second logic state in response to (i) a first read clock, (ii) a first write clock, (iii) a first programmable almost full look-ahead signal and (iv) a first control signal;
   a second set state machine configured to generate a second set-output signal that is either at said first logic state or at said second logic state in response to (i) a second read clock, (ii) a second write clock, (iii) a second programmable almost full look-ahead signal and (iv) a second control signal;
   a synchronizer configured to generate a synchronized output signal in response to said second set-output signal and a reset signal;
   a latch configured to generate (i) a first latch output signal in response to said first set-output signal and said synchronized output signal and (ii) a second latch output signal as a complement of said first latch-output signal, said first latch output signal representing an almost full output flag that is at said first logic state when a FIFO (First In First Out) memory block is almost full, and is at said second logic state when said FIFO is not almost full;
   a first logic block configured to generate said first control signal in response to said second latch output signal; and
   a second logic block configured to generate (i) said reset signal and (ii) said second control signal in response to said first latch output signal.

2. The apparatus of claim 1, wherein said synchronizer comprises:
   a SR latch configured to time said second set-output signal depending on said reset signal; and
   a Flip-Flop (FF) block configured to generate said synchronized signal depending on (i) an external timing signal and (ii) said second set-output signal as timed by said SR latch.

3. The apparatus of claim 2, wherein said external timing signal comprises:
   a free running write clock signal.

4. The apparatus of claim 1, wherein said FIFO comprises:
   a synchronous FIFO.

5. The apparatus of claim 1, wherein said first write clock comprises:
   a first enabled write clock.

6. The apparatus of claim 1, wherein said first read clock comprises:
   a first enabled read clock.

7. The apparatus of claim 1, wherein said second write clock comprises:
   a second enabled write clock.

8. The apparatus of claim 1, wherein said second read clock comprises:
   a second enabled read clock.

9. The apparatus of claim 1 further comprising:
   a first delay block configured to increase a first pulse width of said first latch output signal before said second logic block.

10. The apparatus of claim 9 further comprising:
    a second delay block configured to increase a second pulse width of said second latch output signal before said first logic block.

11. The apparatus of claim 10, wherein said second delay block has a second predetermined delay configured during fabrication.

12. The apparatus of claim 10, wherein said second delay block comprises:
    a programmable delay block configured to change said second pulse width.

13. The apparatus of claim 10, wherein said second delay block comprises:
    a programmable delay block responsive to an externally generated signal.

14. The apparatus of claim 13, wherein said programmable delay block further comprises:
    a joint test access group (JTAG) programmable delay block.

15. The apparatus of claim 14, wherein a set of additional JTAG instructions are utilized to program said JTAG programmable delay block.

16. The apparatus of claim 9, wherein said first delay block has a predetermined delay configured during fabrication.

17. The apparatus of claim 9, wherein said first delay block comprises:
    a programmable delay block configured to change said first pulse width.

18. The apparatus of claim 9, wherein said first delay block comprises:
    a programmable delay block responsive to an externally generated signal.

19. The apparatus of claim 18, wherein said programmable delay block comprises:
a joint test access group (JTAG) programmable delay block.

20. The apparatus of claim 19, wherein a set of additional JTAG instructions are utilized to program said JTAG programmable delay block.

21. An apparatus comprising:
means for generating a first output signal either at a first logic state or at a second logic state in response to (i) a first read clock, (ii) a first write clock, (iii) a first programmable almost full look-ahead signal and (iv) a first control signal;
means for generating a second output signal either at said first logic state or at said second logic state in response to (i) a second read clock, (ii) a second write clock, (iii) a second programmable almost full look-ahead signal and (iv) a second control signal;
means for generating a synchronized output signal in response to (i) said second output signal and (ii) a reset signal;
means for generating (i) a first latch output signal representing an almost full output flag that is at a first logic state when a FIFO memory block is almost full and is at a second logic state when said FIFO is not almost full, in response to said first output signal and said synchronized output signal and (ii) a second latch output signal as a complement of said first latch output signal;
means for generating said first control signal in response to said second latch output signal; and
means for generating (i) said second control signal and (ii) said reset signal in response to said first latch output signal.

22. The apparatus of claim 21 further comprising:
means for increasing a pulse width of said first latch output signal.

23. The apparatus of claim 21 further comprising:
means for increasing a pulse width of said second latch output signal.

* * * * *